Oct. 18, 1960

KOMA. NAKATANI 2,956,764

TRIPOD FOR PHOTOGRAPHING CAMERAS

Filed Oct. 13, 1958

United States Patent Office 2,956,764
Patented Oct. 18, 1960

2,956,764

TRIPOD FOR PHOTOGRAPHING CAMERAS

Koma Nakatani, 461 4-chome Saginomiya, Tokyo, Japan

Filed Oct. 13, 1958, Ser. No. 766,766

Claims priority, application Japan Oct. 16, 1957

2 Claims. (Cl. 248—183)

The present invention relates to a tripod for a camera, and more particularly that for a small size movie photographing camera, such as for a 8 mm. film, which is usable for multiple applications with a single unit tripod, characterized by which a cylindrical member, into which a vertically moving rod is so inserted as to be moved up and down freely is provided with a projecting bearing cylinder, said bearing cylinder being freely held on a bearing plate of holding disc at the upper portion of a leg rod. Thereby, excellent effects can be obtained.

According to the construction referred to above, the present invention enables said vertically moving rod to make a vertical reciprocating motion like in a usual tripod, but said moving rod is also adapted to move horizontally or tilt freely at an appropriate angle.

In the following, the present invention is described in further detail in reference with the accompanying drawings by way of example, not for the purpose of limitation. It should be understood in this case that any modification can, of course, be made within the scope of the invention and without departing from the spirit of the invention, said drawings being as follows.

Figures 1, 4:
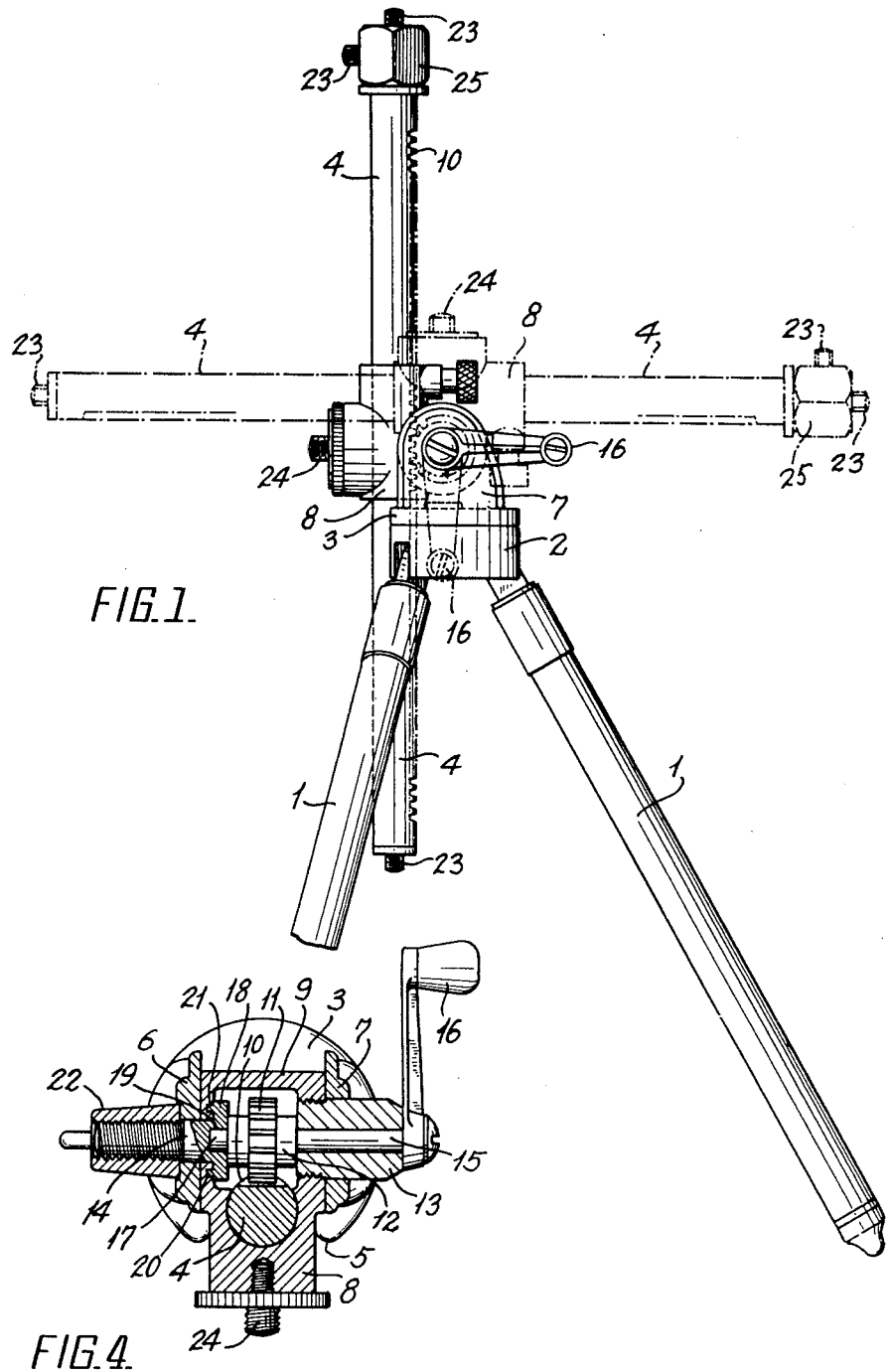
Fig. 1 is a front view of the tripod for a camera according to this invention.
Fig. 4 is a sectional plan view of Fig. 2.
Figures 2, 3:
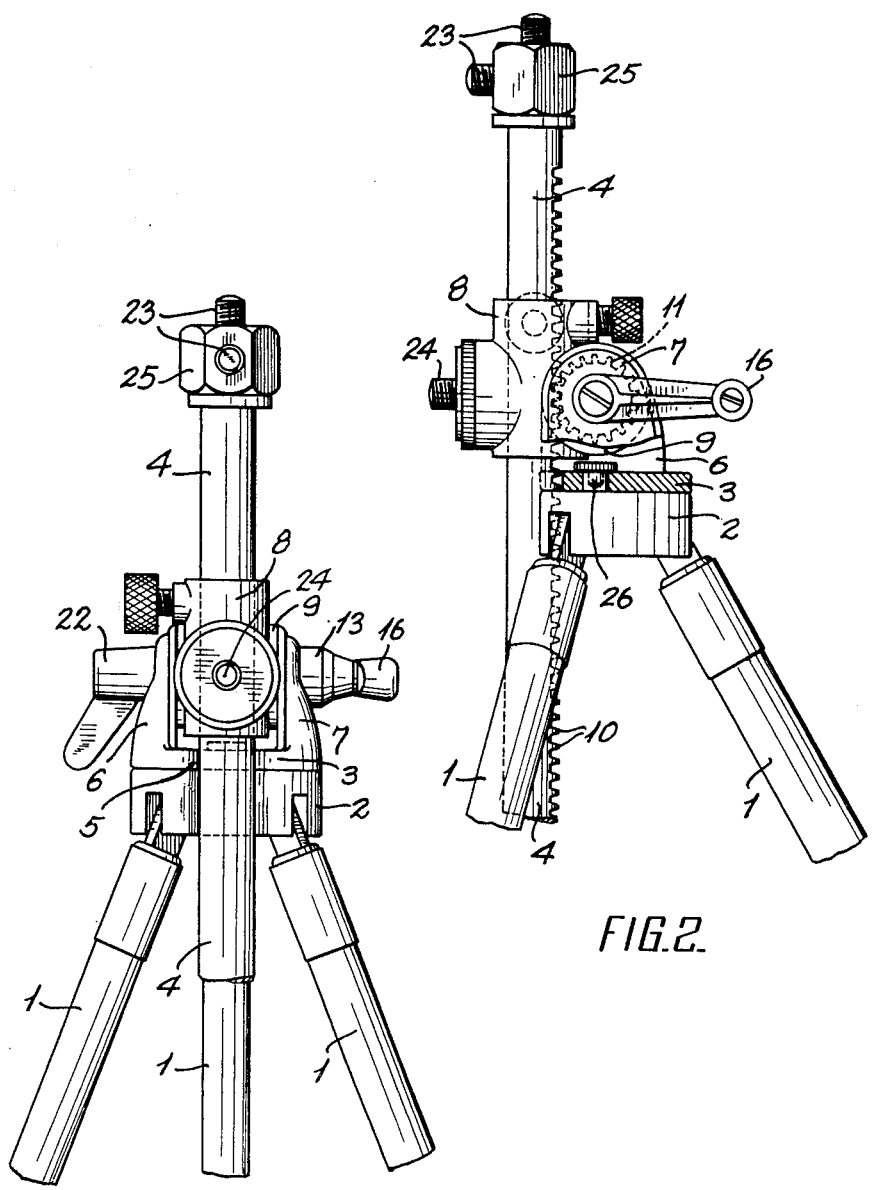
Fig. 2 is a front view of the essential parts of Fig. 1, with a part thereof being taken off.
Fig. 3 is a side view of Fig. 2.

Referring to the accompanying drawings, leg members 1 are pivoted to a disc 2, the top face of which is clamped rotatably with a bearing board 3 by means of a bolt 26, said bearing board 3 being formed with a recess 5, through said recess being inserted a vertically, moving rod 4 with a rack 10 formed on one side thereof; a projecting bearing cylinder 9 on one side of cylinder body 8, through which said vertically moving rod 4 is inserted, being secured between two projecting bearing plates 6, 7 oppositely arranged on the top surface of said bearing board 3. As illustrated in Fig. 4, a spindle 12 with gear wheel 11 mounted thereon is accommodated in said bearing cylinder 9, said gear wheel 11 being in mesh with rack 10 of vertically moving rod 4, said spindle being rotatably journalled on said bearing plates 6, 7 through a hub 13 and screw rod 14.

A construction, wherein spindle 12 is journalled on bearing plates 6, 7, said spindle with a gear wheel 11 mounted thereupon being provided with a fine spindle 15 on one side, said spindle 15 penetrating through a hub cylinder 13, the inner end of said hub cylinder being engaged with a bearing cylinder 9, the outer end being inserted in a bearing plate 7, the front end of said fine spindle being fitted with a handle 16 for moving vertical reciprocating rod 4, and a projecting fine spindle 17 provided on the other side of spindle 12 being rotatably inserted in a socket 19 of an engaging disc 18 provided on the inner surface of screw rod 14 inserted in bearing cylinder 9 and bearing plate 6, several engaging projections 20 provided on the outer surface of said engaging disc being held in a cavity 21 of the inner surface of bearing cylinder 9 and screw rod 14 protruding outside of bearing plate 6 and being engaged with a clamping nut 22.

Screws 23 are provided on both ends of ascending rod 4 for an instrument bed; and further a screw 24 for the instrument bed is provided, on one side surface of cylinder body 8 through which said vertical reciprocating rod extends.

In the following, the method of manipulating the apparatus of this invention and the manner in which this invention is operated are explained.

To begin with, in case a vertically moving rod 4 is caused to expand and contract vertically, the clamping handle 22 will be turned in the clamping direction, the bearing cylinder 9 being then fixed to the bearing plate 6 and the handle 16 being turned, then the gear wheel 11 provided on spindle 12 being engaged with rack 10 of the vertically moving rod 4, said rod being moved vertically to and fro. Further, when the rod 4 is used in a tilted or horizontal position, first clamping handle 22 will be slackened for relieving the closely fixed condition of sliding face between the bearing cylinder 9 and the bearing plate 6 both engaged with screw rod 14, the vertically moving rod 4 as shown in chain line in Fig. 1, to turn said rod to any desired angular or horizontal direction. Namely, the bearing cylinder 9, screw rod 14 secured to said bearing cylinder by engaging rod 20 and the hub cylinder 13 screwed to one side of said bearing cylinder revolve in one body. Following to this motion, the gear wheel 11 of spindle 12 tilts as engaged with rack 10 of the rod 4, which clamps the clamping handle 22. Furthermore, if holding board 3 is made to rotate with instrument bed 2 fixed by leg rod 1, the rod 4 will revolve as in an inclined position resulted. Then, if the handle 16 is revolved, the rod 4 will freely reciprocate.

Since the present invention is constructed as abovementioned, the present invention is adapted to a tripod for small type movie picture photographing, and particularly of 8 mm. and the like, a photographic camera is secured to a screw 23 for fitting an instrument bed provided on one end of the vertically moving rod 4 of a tilted condition, and photographing can be effected without shaking of camera, while the rod 4 is being rotated; when the camera is fitted to screw 23 on one end of the rod 4 in a tilted condition, or particularly lower objects can readily be photographed in a simple operation as mentioned above, without requiring a contact photographing means. When the camera is secured to screw 24 provided on cylinder body 8 through the instrument bed, two cameras can be used simultaneously, objects of different positions may be photographed, and illuminating instruments such as a radiating device, etc. may be fitted to screws 23 at both ends of rod 4. When a nipping frame member for cinema title is fitted to the instrument bed securing screw 23 engaged with the front end of rod 4, a title-photographing can be done, while said vertically moving rod 4 is being moved.

Further, when seat member 25 is secured to the side face, said seat member having several screws 23, then several cameras as well as several illuminating devices can be used simultaneously.

What I claim:

1. A tripod for a photographing camera comprising a disc, supporting legs pivoted to said disc extending downwardly from the lower face thereof, a bearing board rotatably clamped to the upper face of said disc, said bearing board having a recess on one side thereof, upwardly extending spaced parallel bearing plates fixed to the upper face of said bearing board, a hollow cylindrical body disposed between said bearing plates, a bearing cylinder extending outwardly from one side of said cylindrical body having a cylindrical bore therethrough with a longitudinal opening into the interior opening in said cylindrical body, a rod slidably fitted in the bore in said bearing cylinder extending therethrough and through the recess in said bearing board, said rod having a toothed rack formed thereon projecting through the longitudinal opening in the bore of said bearing cylinder into the interior of said cylindrical body, a gear wheel within said cylindrical body meshing with the teeth of the rack formed on said rod to move said rod axially in the bore of said bearing cylinder, a spindle carrying said gear wheel, a hub extending through one of said bearing plates and the adjacent wall of said hollow cylindrical body in which a section of said spindle having a reduced diameter is journaled, a handle fixed to said spindle beyond the bearing plate through which the hub extends for rotating said spindle and said gear wheel carried thereby to slide said rod in the bore of said bearing cylinder, a screw rod extending through the other of said bearing plates and through the adjacent wall of said cylindrical body having a socket therein in which the other end of said spindle is journaled, and a screw on one end of said slidable rod for engagement with a camera bed.

2. A tripod for a photographing camera according to claim 1, wherein said hub is fixed in the wall of said hollow cylindrical body through which it extends to provide a journal for said body in the bearing plate through which said hub extends, said screw rod is positioned coaxially with said hub to provide a rotary pivot for said cylindrical body with respect to the bearing plate through which said screw rod passes, said screw rod has formed thereon within said bearing cylinder an engaging disc having engaging projections for engagement with a cavity on the inner face of the bearing cylinder wall through which said screw rod projects, and a clamping nut is threaded upon said screw rod to bear upon the outer face of the adjacent bearing plate to draw the engaging disc formed on said screw rod toward the inner wall of said bearing cylinder with its engaging projections into engagement with the cavity in the inner face of the bearing cylinder wall through which said screw rod projects, whereby loosening of said clamping nut permits said hollow cylindrical body to be turned about the axis of said hub and said screw rod and tightening of said nut fixes the position of said hollow cylindrical body in desired angular position with respect to such axis.

References Cited in the file of this patent

UNITED STATES PATENTS

| | | |
|---|---|---|
| 2,151,877 | Walker | Mar. 28, 1939 |
| 2,326,552 | Morse | Aug. 10, 1943 |
| 2,541,535 | Neff | Feb. 13, 1951 |
| 2,599,269 | Markle | June 3, 1952 |

FOREIGN PATENTS

| | | |
|---|---|---|
| 837,319 | Germany | Apr. 21, 1952 |